2 Sheets—Sheet 1.
H. KEEVIL.
Dissolving-View Lantern.
No. 221,573. Patented Nov. 11, 1879.
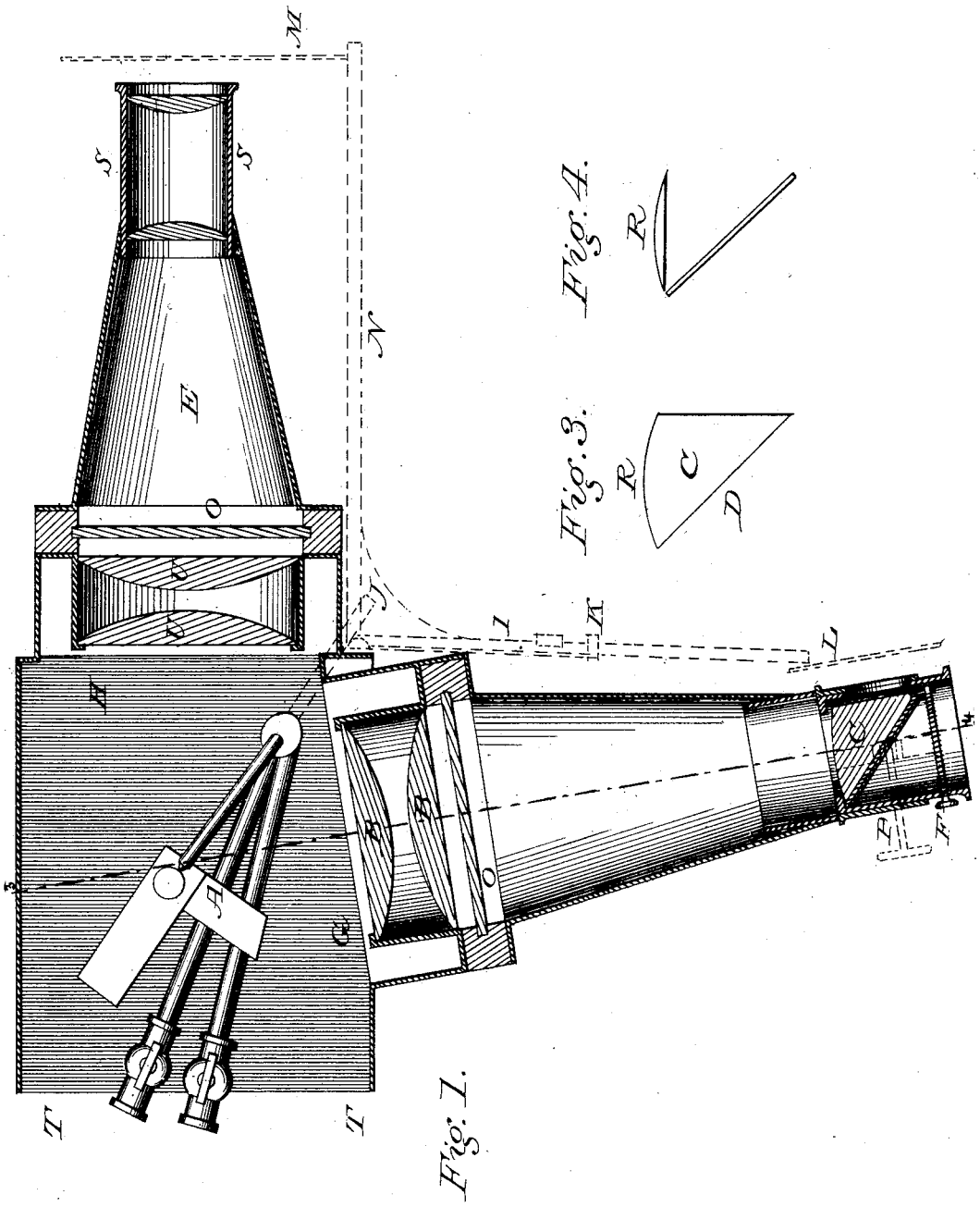
Witnesses:
James Hitchens
James Heath
Inventor:
Henry Keevil

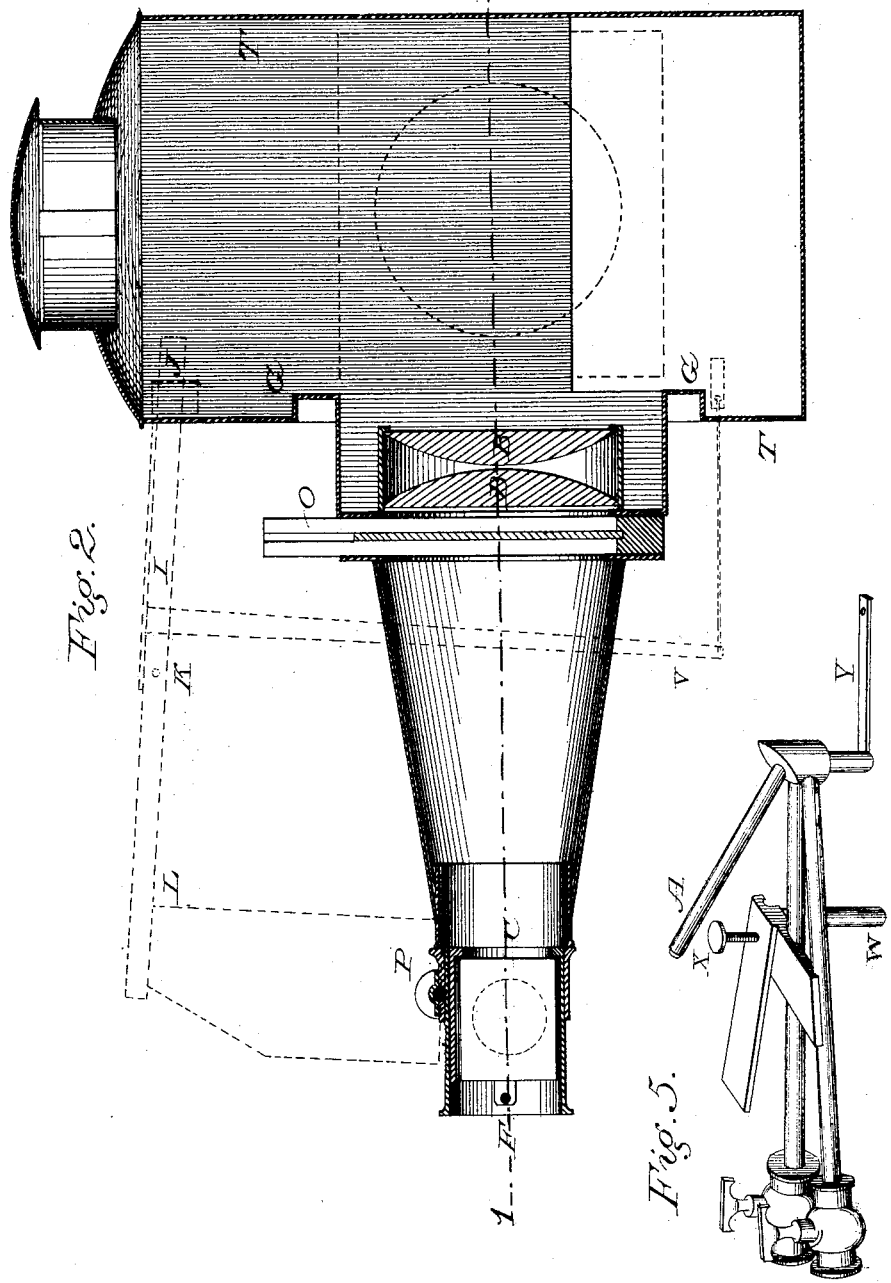

UNITED STATES PATENT OFFICE.

HENRY KEEVIL, OF BATH, SOMERSETSHIRE, ENGLAND.

IMPROVEMENT IN DISSOLVING-VIEW LANTERNS.

Specification forming part of Letters Patent No. 221,573, dated November 11, 1879; application filed April 1, 1879.

*To all whom it may concern:*

Be it known that I, HENRY KEEVIL, of Bath, Somersetshire, England, have invented an Improved Dissolving-View Magic Lantern, of which the following is a specification.

The object of my invention is to so construct a magic lantern that the optical effects known as "dissolving views" may be obtained by means of the one lantern having but one burner, and this object I attain in the manner which I will now proceed to describe, reference being had to the accompanying drawings, in which—

Figure 1, Sheet 1, is a sectional plan on the line 1 2, Fig. 2, of my improved magic lantern. Fig. 2, Sheet 2, is a vertical section on the line 3 4, Fig. 1; Figs. 3 and 4, Sheet 1, diagrams illustrating the forms of lenses which may be used; and Fig. 5, a perspective view of the gas-tubes and burner detached from the lantern.

To produce with magic lanterns the optical effects known as "dissolving views," it has been usual heretofore to use two separate lanterns, each with its own burner, the light of one burner being turned down as the other is turned on.

By my invention I am enabled to produce dissolving views with one lantern and one burner by constructing, in addition to the ordinary lens-tube with direct lens, another tube at right angles, or thereabout, to the first, and containing a prismatic or equivalent lens for deflecting the rays of light at the proper angle, so as to project the picture onto the display-screen at the required point.

To the front H of the body T T of the lantern, which is provided with a suitable burner, A, is adapted the usual tube E, with condensing-lens U U, adjustable direct magnifying-lens S S, and stage O, for the reception of the picture-slide.

To the side G of the lantern-body is adapted a second tube with similar condensing-lens, B B, and stage O for the picture-slide. In the outer end of this second tube I arrange an adjustable tube carrying a prismatic lens, C.

The diagonal face D, Fig. 3, of the prism is silvered, so that when the lantern is in use and the proper focus has been obtained, by adjusting the screw F and its spring, connected to the lens-frame, and by adjusting the tube by means of the rack and pinion P, the converging rays of light passing from the burner A through the condenser B B will be deflected by this prismatic lens nearly at right angles, and projected through an opening in the side of the lens-tube onto the same point on the display-screen as the rays of light which pass through the direct optical tube E from the same burner.

By "prismatic lens" I wish to be understood as meaning a right-angled prism of glass having one of its surfaces, R, Fig. 3, formed convex, and of such a radius as to magnify the pictures to an extent similar to that produced by the direct lens S S.

The prism may be made achromatic in the usual well-known way, if desired. Instead of the prismatic lens, I may use a plane glass, silvered speculum, or metallic speculum, arranged at the proper angle, and combined with an adjustable lens or lenses to obtain a proper focus, as shown in the diagram, Fig. 4.

The tube carrying the prismatic lens should preferably be arranged at a little less than a right angle to the tube E, as shown in Fig. 1.

The burner shown in the drawings is intended for the burning of the oxycalcium or lime light, there being the usual valved gas-tubes and burner, and opposite the latter is arranged the lime-holder. These gas-tubes, burner, and lime-holder are held in a frame having a pivot-pin, W, Fig. 5, adapted to a socket in the bottom of the lantern, so that the burner can be turned partially round for the purpose of bringing the flame directly opposite either the condenser B B or U U, as may be required.

By using in connection with the above-described magic-lantern apparatus a suitable system of shutters, dissolving views may readily be produced on the display-screen. I have indicated by dotted lines in Figs. 1 and 2 an arrangement of shutters and levers for this purpose.

To an arm, J, secured to the upper part of the lantern-body, is pivoted a lever, L, at K, Fig. 2, this lever carrying at its outer end a shutter to cover or intercept the rays of light emanating from the prismatic lens. To the other end of this lever is attached at right angles thereto an arm, N, carrying at its outer end a shutter, M, Fig. 1, to cover the rays of light from the direct lens S S.

To the lever L, near its pivoting-point, is secured a pendent arm, V, Fig. 2, connected to an arm, Y, on the end of the pivoted gas-burner, so that when the burner is turned so as to bring the flame opposite the condenser U U, the shutter M will be raised and the lever L with its shutter depressed, so as to cut off the rays of light from the prismatic lens; and, accordingly, when the burner is turned so as to bring the flame opposite the condenser B B, the lever L will be raised and the shutter M depressed.

I claim as my invention—

1. In a magic lantern, the combination of a burner and a direct lens-tube with a lens-tube having a prismatic or other deflecting lens, and devices for cutting off the rays of light emanating from either tube, substantially as described.

2. The combination, in a magic lantern, of a direct lens-tube and a tube having a deflecting-lens with a burner pivoted, substantially as described, so as to bring the flame directly opposite the condensing-lens of either tube, as set forth.

In witness whereof I, the said HENRY KEEVIL, have hereunto set my hand and seal.

HENRY KEEVIL. [L. S.]

Witnesses:
JAMES HITCHENS,
JAMES HEATH.